(12) United States Patent
Fraser et al.

(10) Patent No.: US 10,692,619 B2
(45) Date of Patent: Jun. 23, 2020

(54) METHODS AND DEVICES FOR TREATING RADIONUCLIDES IN A LIQUID

(71) Applicant: Reverse Ionizer Systems, LLC, Bethesda, MD (US)

(72) Inventors: Desmond A. Fraser, Herndon, VA (US); Patrick J. Hughes, Vienna, VA (US); Hossein Ghaffari Nik, Fairfax, VA (US); Akrem Hassen Adem Aberra, Fairfax, VA (US); Richard B. McMurray, Fairfax, VA (US); Shelley Marie Grandy, Fairfax, VA (US)

(73) Assignee: Reverse Ionizer Systems, LLC, Bethesda, MD (US)

( * ) Notice: Subject to any disclaimer, the term of this patent is extended or adjusted under 35 U.S.C. 154(b) by 0 days.

(21) Appl. No.: 15/861,664

(22) Filed: Jan. 3, 2018

(65) Prior Publication Data
US 2019/0206582 A1    Jul. 4, 2019

(51) Int. Cl.
| | | |
|---|---|---|
| G21F 9/10 | (2006.01) | |
| C02F 1/463 | (2006.01) | |
| C02F 1/465 | (2006.01) | |
| C02F 101/00 | (2006.01) | |

(52) U.S. Cl.
CPC .............. *G21F 9/10* (2013.01); *C02F 1/463* (2013.01); *C02F 1/465* (2013.01); *C02F 2101/006* (2013.01); *C02F 2201/4612* (2013.01); *C02F 2201/4613* (2013.01); *C02F 2201/4614* (2013.01); *C02F 2201/46125* (2013.01); *C02F 2201/46135* (2013.01)

(58) Field of Classification Search
CPC .. G21F 9/10; C02F 1/463; C02F 1/465; C02F 2101/006; C02F 2201/4612–4614
See application file for complete search history.

(56) References Cited

U.S. PATENT DOCUMENTS

| | | |
|---|---|---|
| 4,485,360 A | 11/1984 | Seward |
| 5,152,341 A | 10/1992 | Kasevich |
| 5,173,169 A | 12/1992 | Garrison |
| 5,326,446 A | 7/1994 | Binger |
| 5,422,481 A | 6/1995 | Louvet |
| 5,568,121 A | 10/1996 | Lamensdorf |
| 5,598,572 A | 1/1997 | Tanikoshi |

(Continued)

FOREIGN PATENT DOCUMENTS

| | | |
|---|---|---|
| WO | WO 96/12677 | 5/1996 |
| WO | WO2007133634 | 11/2007 |

(Continued)

OTHER PUBLICATIONS http://www.dolphinwatercare.com/how-the-dolphin-system-works, Dolphin Watercare web site, "How it works: The Technology of Sustainable Water Treatment".

(Continued)

*Primary Examiner* — Nicholas A Smith
(74) *Attorney, Agent, or Firm* — Capitol Patent & Trademark Law Firm, PLLC

(57) ABSTRACT

Radionuclides and other unwanted material in a liquid may be treated, removed or reduced through the use of electromagnetic fields applied to the liquid by electrodes that also function as co-precipitators by leaching polyvalent metal ions into the liquid.

18 Claims, 9 Drawing Sheets

(56) References Cited

U.S. PATENT DOCUMENTS

| | | |
|---|---|---|
| 5,606,723 A | 2/1997 | Morse |
| 5,667,677 A | 9/1997 | Stefanini |
| 5,738,766 A | 4/1998 | Jefferson |
| 6,063,267 A | 5/2000 | Crewson et al. |
| 6,267,933 B1 | 7/2001 | Thomason |
| 6,375,829 B1 | 4/2002 | Shevchenko et al. |
| 6,641,739 B2 | 11/2003 | Dresty et al. |
| 7,244,360 B2 | 7/2007 | Cho |
| 7,419,603 B2 | 9/2008 | Cho |
| 2001/0035342 A1 | 11/2001 | Morse |
| 2002/0185446 A1* | 12/2002 | Johnny ............... C02F 1/463 210/709 |
| 2003/0062321 A1* | 4/2003 | Kitayama ............ C02F 1/4676 210/748.2 |
| 2004/0141876 A1 | 7/2004 | Paskalov |
| 2005/0199484 A1 | 9/2005 | Olstowski |
| 2006/0175200 A1 | 8/2006 | Holland |
| 2006/0196817 A1 | 9/2006 | Crewson et al. |
| 2006/0213236 A1* | 9/2006 | Nomura ............... D06F 35/003 68/13 A |
| 2007/0051685 A1 | 3/2007 | Wittmer |
| 2007/0120563 A1 | 5/2007 | Kawabata et al. |
| 2008/0264800 A1 | 10/2008 | Schlager |
| 2009/0206974 A1 | 8/2009 | Meinke |
| 2010/0078332 A1* | 4/2010 | Gomez ............... C02F 1/463 205/339 |
| 2010/0102003 A1 | 4/2010 | Holland |
| 2011/0240567 A1 | 10/2011 | Zolezzi-Garreton |
| 2011/0284231 A1 | 11/2011 | Becker |
| 2012/0217815 A1 | 8/2012 | Clark |
| 2013/0146464 A1 | 6/2013 | Shiga |
| 2013/0277045 A1 | 10/2013 | Parsche |
| 2014/0216936 A1 | 8/2014 | Hughes |
| 2014/0326681 A1 | 11/2014 | Denvir |
| 2014/0374236 A1 | 12/2014 | Moore et al. |
| 2015/0143918 A1 | 5/2015 | Schaefer et al. |
| 2016/0016829 A1 | 1/2016 | Hughe et al. |
| 2016/0107905 A1* | 4/2016 | Hughes ............... C02F 1/487 204/663 |
| 2016/0251240 A1 | 9/2016 | Fraser et al. |
| 2017/0066665 A1* | 3/2017 | Choi ..................... B01D 61/42 |
| 2018/0141835 A1* | 5/2018 | Canicio Bardolet ... C02F 1/008 |

FOREIGN PATENT DOCUMENTS

| | | |
|---|---|---|
| WO | WO2008062171 | 5/2008 |
| WO | WO2011080679 | 7/2011 |

OTHER PUBLICATIONS

Cho et al., "Mitigation of Calcium-Carbonate Fouling Using RF Electric Fields", Proc. of Intl. Conf. on Heat Exchange Fouling and Cleaning VIII, pp. 384-391, Jun. 2009, Austria.

* cited by examiner

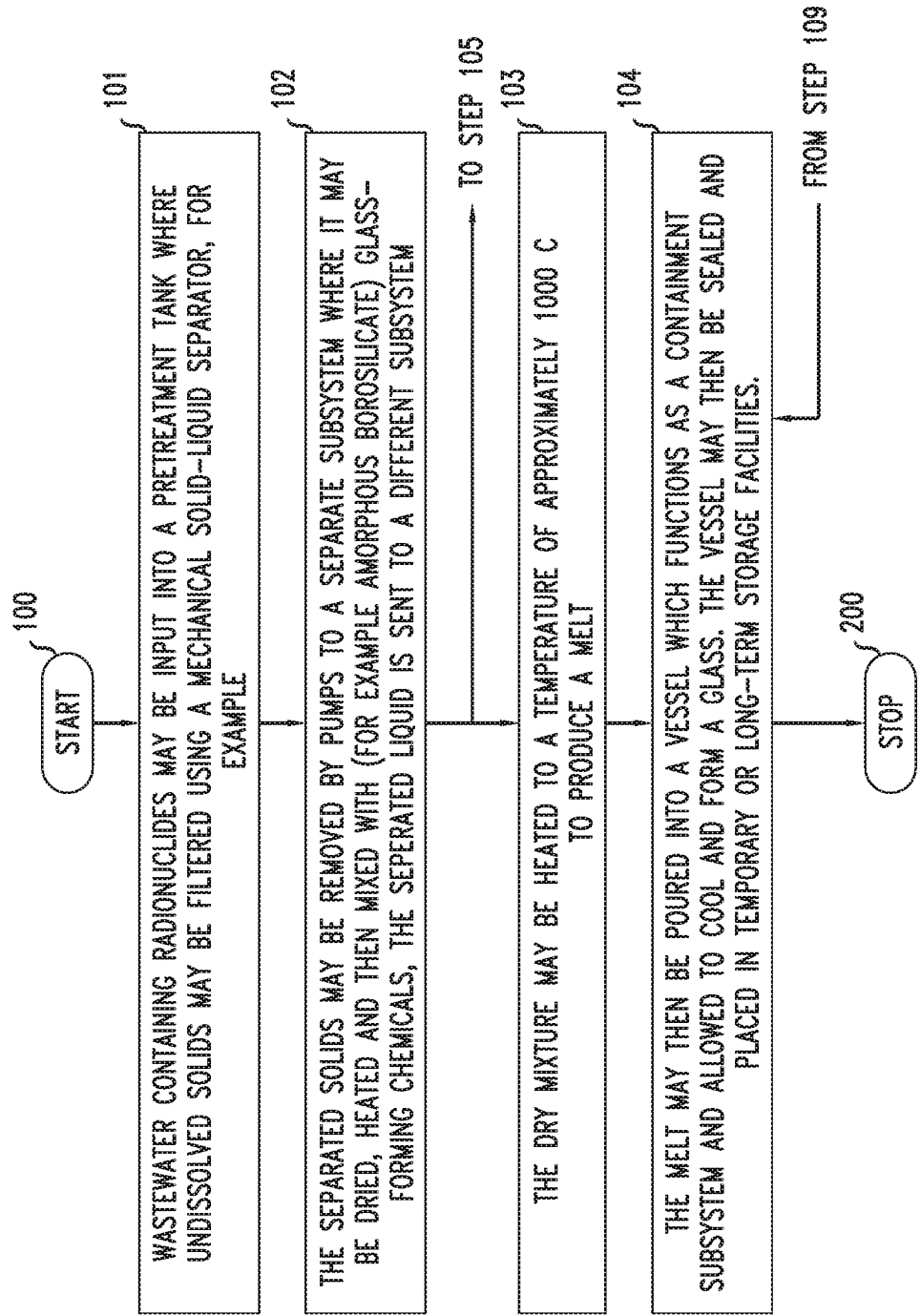

FIG. 5C

FROM BOX 110

THE LIQUID MAY BE PASSED THROUGH ION EXCHANGE MEMBRANES TO REMOVE ANY LEFTOVER RADIOACTIVE IMPURITIES AND THROUGH REVERSE OSMOSIS MEMBRANES TO REMOVE MICROSCOPIC PARTICULATE AND LOW CONCENTRATIONS OF DISSOLVES MATERIALS BEFORE BEING DISCHARGED AS PURIFIED WATER.

METHODS AND DEVICES FOR TREATING RADIONUCLIDES IN A LIQUID

RELATED APPLICATIONS

The present application is related to U.S. patent application Ser. No. 14/170,546 (the "'546 application"), Ser. No. 14/624,552 (the "'552 Application"), Ser. No. 14/820,550 (the "550 application), Ser. No. 14/821,604 (the "'604 Application"), Ser. No. 14/979,501 (the "'501 application"), Ser. No. 15/237,124 (the "'124 application") and Ser. No. 15/339,578 (the "578 application"), and incorporates by reference herein the entireties of the disclosures of each of the above-identified applications as if set forth herein in full.

INTRODUCTION

Radionuclides (radioactive material) are atoms with excessive nuclear energy which makes them unstable. Increased radionuclides in wastewater poses a severe threat to human health and the environment. Accordingly, there exist processes for removing radionuclides from wastewater.

Some sources of radionuclides in wastewater are as follows: mining and processing of radioactive materials, nuclear reactor cooling systems, remediation processes used in the storage and disposal of spent nuclear fuel, reclaiming previously irradiated contaminated land sites, oil well-cracking processes, and the disposal of medical isotopes.

One existing process of removing radionuclides involves adjusting the pH of wastewater, sometimes in conjunction with the addition of chemical reactive agents (reagents), to cause precipitation of various radioactive insoluble salts. Precipitation of the radionuclides into such salts typically involves the steps of chemical coagulation, sedimentation, and solid-liquid separation (thickening, clarification and filtration). In the end, such precipitation makes it easier to extract the precipitated radionuclides.

Various reagents exist to aid in the precipitation of the radionuclides in radioactive contaminated wastewater in to salts, including metal hydroxides, oxalates, carbonates, peroxides, and fluorides, etc . . . . Typically, after precipitation a process of solid-liquid extraction is used to remove the radionuclide precipitates (salts). Further processing may be applied to decontaminate the water from other impurities so that it can be discharged into the environment.

As mentioned above, to precipitate out radionuclides a solid-liquid separation step is typically required. In general, the specific process that is used to complete the solid-liquid separation step affects the quality of the water that is ultimately discharged into the environment. In addition, the specific solid-liquid separation process used affects the amount of additional reagent that will be needed to effectively decontaminate the radioactive, contaminated wastewater (i.e., one process may require less, or more, chemicals than another process).

Co-precipitators may sometimes be included in a precipitation process depending upon the volume of contaminated wastewater needed to be treated, and the amount of non-radioactive water expected to be produced. For example, a co-precipitator may reduce the treatment time needed to create non-radioactive contaminated water (hereafter "decontaminated water").

However, because many co-precipitators are typically chemical reagents, the application (i.e., combination) of such chemical reagents to radionuclide precipitants from wastewater, may produce unwanted byproducts that warrant further treatment processes.

Accordingly, it is desirable to provide for methods and devices that (i) eliminate, or reduce, the reliance upon chemical treatment processes to aid in the precipitation process, (ii) increase the level of radionuclide precipitation, (iii) limit unwanted precipitation byproducts, and (iv) reduce treatment time and cost.

BRIEF DESCRIPTION OF DRAWINGS

FIGS. 5A through 5C depicts a simplified flow diagram of an exemplary method for treating radionuclides in a liquid according to one embodiment of the invention.

SUMMARY

Figure 1:
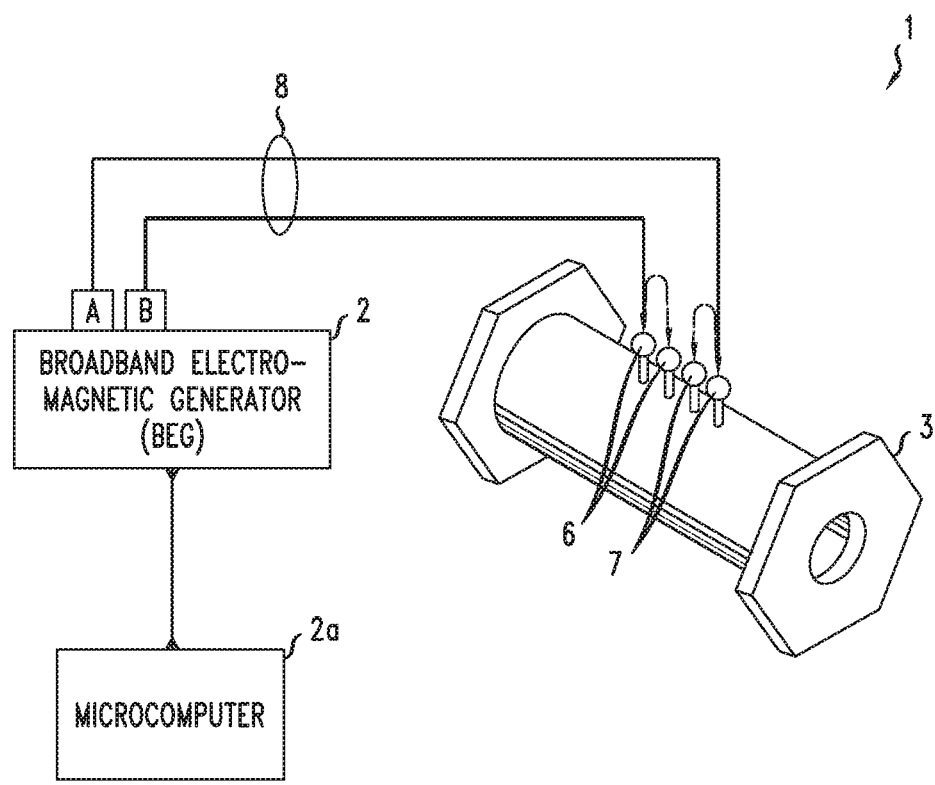
FIG. 1 depicts an exemplary device for treating radionuclides in a liquid according to one embodiment of the invention.

To eliminate, or reduce, the reliance upon chemical treatment processes to aid in the precipitation of radionuclides, increase the level of radionuclide precipitation, limit unwanted precipitation byproducts, and reduce treatment time and cost, the inventors have discovered devices and related methods that function as co-precipitators that target radionuclide particles, while assisting chemical agents in the precipitation of radioactive insoluble salts. In one embodiment, an electrocoagulation-flocculation device that includes as least one anode and one cathode functions as a co-precipitator (which can be made of aluminum, iron, stainless steel, etc.) by, for example, leaching polyvalent metal ions from its anode and cathode, into radioactive contaminated wastewater to help coagulate and flocculate radionuclide precipitates for easy removal using a solid-liquid extractor.

In one embodiment the electrocoagulation-flocculation device may be a combination of a Radionuclide Electrocoagulation-flocculation-Lorentz Force Alternative Current (AC) Probe) (hereafter referred to as "probe") and a Broadband Electromagnetic Generator ("BEG" or just "generator"). The probe may be an electrochemical device that includes structure that is operable and configurable to leach polyvalent metal ions into wastewater to reduce the amount of chemical reagents (i.e., precipitators) required to decontaminate the wastewater. For example, the probe may reduce the chemical reagent-to-wastewater volume ratio on the order of 1,000,000:1. The rate of leaching of the metal cation, and subsequently the rate of degradation of the electrode, is controlled by the electrode operating current. In an embodiment, the electrode operating current is controlled such that the pH is kept within the range of 4-7.

Furthermore, the polyvalent metal cations that leach from the probe's structure act as destabilizing agents by reducing repulsive forces between radionuclide particles and the polyvalent metal cations. The reduction in repulsive forces leads to the neutralization of electric charges of such particles, thus lowing an energy barrier to enable the particles aggregate with the polyvalent metal cations. This process may be involved in an "electrocoagulation" process referred to herein.

The inventors have discovered that the unique devices provided by the present invention offer benefits over existing techniques. For example, existing techniques require large amounts of chemical reagents to achieve precipitation, which often results in undesired byproducts. In contrast, some non-limiting benefits of the unique devices provided by the present invention are: (i) ease of operation due to a one-time installation, (ii) requires less maintenance because the probe and generator are non-moving parts, (iii) sludge formed in the process of electrocoagulation easily settles and it is easy to remove, (iv) flocculations ("flocs") formed at the surface by electrocoagulation can be separated faster by filtration, (v) the resultant wastewater that is discharged (i.e., effluent) has less total dissolved solids (TDS) because the radionuclides have been removed along with the precipitated salts, (vi) small, colloidal particles are also easily removed, (vii) when the inventive devices are used as a part of a wastewater pre-treatment process, the devices aid in reverse osmosis (RO) processes that remove pollutants that clog RO filter membranes, thus making RO more economical by reducing the cost of replacing a filter and downtime, and (viii) significantly reduces the amount of chemical reagents required to treat wastewater by reducing the ratio of chemical reagents to radionuclides per volume of wastewater to significantly less than a typical value of 1,000,000:1.

In another embodiment, a device for treating radionuclides in a liquid (e.g., wastewater, or radioactive wastewater) is provided where the device may comprise: (i) a generator operable to generate a voltage, and to apply the voltage to at least one anode electrode and one cathode electrode configured to leach polyvalent metal ions into the liquid and to form flocculated, radionuclide precipitates in the liquid; and (ii) a microcontroller operable to generate signals to control the rate of leaching of the metal ions and formation of the radionuclide precipitates. The microcontroller may be further operable to generate signals to control the value of an electrical current through the electrodes and to control the pH of the liquid in a range of 4-7. The at least one anode electrode and one cathode electrode may yet further be configured to leach the polyvalent metal ions into the liquid and to form hydrogen microbubbles in the liquid surrounding a surface of the cathode electrode to capture radionuclide precipitates.

The at least one anode or at least one cathode may comprise aluminum, iron, stainless steel, iron nanoparticles, or aluminum nanoparticles, for example. Further, the electrodes may be operable to generate and apply an electric field associated with the applied voltage to accelerate radionuclides in the liquid. Still further, the device may comprise a pair of magnetic coils (e.g., Helmholtz coils) operable to generate and apply a magnetic field associated with the applied voltage to the radionuclides over a range of frequencies unique to the radionuclides and to exert Lorenz forces on the radionuclide precipitates to change the morphology of the radionuclide precipitates.

In a further embodiment the microcontroller may be operable to control the polarity of the at least one anode and cathode electrodes to reverse the polarity of each electrode in order to control the pH value of the liquid at a substantially neutral value.

In yet another embodiment, the microcontroller may be further operable to adjust an overall impedance of a representative electrical circuit comprising the electrodes, the generator and a conductor to control an amplitude of the voltage and to apply optimum Lorentz type forces to radionuclides in the liquid in combination with impedance matching circuitry.

In addition to the exemplary devices described herein, the invention provides related methods for treating radionuclides in a liquid (e.g., wastewater, radioactive wastewater). One such method comprises forming flocculated, radionuclide precipitates in a liquid by generating a voltage and applying the generated voltage to electrodes and leaching polyvalent metal ions into the liquid; and controlling the rate of leaching of the metal ions and formation of the radionuclide precipitates, where the leaching may be controlled by controlling a current to the electrodes. This method may further include controlling the pH of the liquid in a range of 4-7 by controlling the current, for example, and leaching the polyvalent metal ions into the liquid and forming hydrogen microbubbles in the liquid to capture the radionuclide precipitates.

Such an exemplary method may further comprise generating and applying an electric field associated with the applied voltage to accelerate radionuclide precipitates in the liquid, and generating and applying a magnetic field associated with the applied voltage to the radionuclides over a range of frequencies unique to the radionuclides to exert Lorenz forces on the radionuclide precipitates to change the morphology of the radionuclide precipitates.

In addition, the exemplary method may comprise controlling the polarity of the electrodes to reverse the polarity of each electrode to control the pH value of the liquid at a substantially neutral value, and adjusting an overall impedance of a representative electrical circuit comprising the electrodes, a generator for generating the voltage, and a conductor in order to control an amplitude of the voltage and to apply optimum Lorentz type forces to radionuclides in the liquid.

In yet another embodiment, a method may comprise receiving information related to formation of the radionuclide precipitates in the liquid at a remote monitoring station, and controlling the rate of leaching of the metal ions and formation of the radionuclide precipitates, among other things, from the remote station, where the formation of the radionuclide precipitates occurs due the application of a voltage to electrodes and through the leaching of polyvalent metal ions into the liquid.

DETAILED DESCRIPTION, INCLUDING EXAMPLES

Exemplary embodiments of devices and related methods for treating radionuclides in liquids with electromagnetic fields are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein the phrase "unwanted material" includes all types of material, in dissolved or undissolved form which degrades or otherwise detracts from a desired quality of a liquid, such as water. One non-limiting example of unwanted material includes, but is not limited to, radionuclides in wastewater. It should be understood that radionuclides may also be considered a type of pollutant (sometimes referred to as a "targeted pollutant" herein).

As used herein the phrases "treat", "treating," "treatment" and other tenses of the word treat mean the reduction, removal, minimization, dissolution and elimination of unwanted material and the prevention of such unwanted material. Further the phrases "treating a liquid" and "treating unwanted material" and their other tenses may be used synonymously herein to describe the treatment of a liquid that contains unwanted material. As used herein the phrase "probe" means an element of one of the inventive devices described herein that may be used to treat a liquid that contains unwanted material, such as radionuclides.

It should be understood that when the description herein describes the use of a "microcontroller", or "controller" that such a device includes stored, specialized instructions for completing associated, described features and functions, such as computations or the generation of control signals, for example. Such instructions may be stored in onboard memory or in separate memory devices. Such instructions are designed to integrate specialized functions and features into the controllers, and microcontrollers that are used to complete inventive functions, methods and processes related to treating a liquid that contains unwanted material by controlling one or more inventive systems or devices/components used in such a treatment. Such instructions, and therefore functions and features, are executed by the microcontrollers or controllers described herein at speeds that far exceed the speed of the human mind.

Referring now to FIG. 1, there is depicted a device 1 according to an embodiment of the invention. As depicted, the device 1 may comprise a Broadband Electromagnetic Generator (BEG) 2 (or just "generator" for short) that comprises a structure having an output impedance of 50-ohms. The generator 2 may comprise structure operable to function to generate and apply radio frequency (RF) power (P) into an input port 6,7 of an exemplary, 50-ohm probe 3. Also shown is microcontroller 2a that is operable to control the generator 2. For example, the microcontroller 2a may be operable to send control signals to the generator in order to control the amplitude of signals (voltages) generated by the generator 2, modulation frequencies of such signals as well as the overall impedance of a representative electrical circuit that contains the generator 2, conductors 8 (e.g., cables) and probe 3 as described in more detail herein. In particular, the generator 2 may be operable to generate a voltage, and to apply such a voltage to at least one anode electrode and one cathode electrode 4a,4b (see FIG. 2) of the probe 3 which are configured to leach polyvalent metal ions into a liquid, and to form flocculated, radionuclide precipitates in the liquid. In sum, in an embodiment, the microcontroller 2a may be operable to generate one or more control signals to control the generator 2 which in turn controls the rate of leaching of the metal ions from the electrodes 4a,4b and formation of the radionuclide precipitates.

The probe 3 may comprise an electric field generating section that may include one or more electrodes 4a,4b (see FIGS. 2 and 4) constructed of a polyvalent metal or metals (e.g., aluminum, iron, stainless steel, iron nanoparticles, aluminum nanoparticles, etc.). In one embodiment, the device 1 may function to electrocoagulate-flocculate unwanted material in a liquid, such as radionuclides in wastewater. For example, at least one anode electrode and one cathode electrode 4a,4b may function as co-precipitators by, for example, leaching polyvalent metal ions into radioactive contaminated wastewater to help remove radionuclide precipitates using a solid-liquid extractor (not shown in FIG. 1). In more detail, the leaching of the polyvalent metal ions from the electrodes may reduce the ratio of required chemical reagents-to-wastewater volume to less than 1,000,000:1. In an embodiment, the microcontroller 2a may be operable to output control signals to control the current through the electrodes 4a,4b which, in turn, may control the rate of leaching of the metal ions, and subsequently the rate of degradation of the electrode. Further, in one embodiment controlling the operating current may be used to control the pH of the wastewater being treated so that it may be maintained within the range of 4-7.

The polyvalent metal ions (e.g., cations) that leach from the probe's structure act as destabilizing agents by reducing the repulsive forces between radionuclide particles and the polyvalent metal ions. The reduction in repulsive forces leads to the neutralization of electric charges of such particles in the liquid, thus lowers the energy barrier to enable the particles to aggregate with the polyvalent metal ions (i.e., electrocoagulation).

In more detail, the probe's 3 electric field generating section (electrodes 4a,4b) and magnetic field generating section (e.g., coils 5a, 5b in FIG. 2) may be operable to function to electro-coagulate and electro-flocculate precipitated radioactive salts. For example, electrocoagulation-flocculation may result from the electrodes 4a,4b (among other elements) functioning to (i) generate and apply an electric field associated with an applied voltage to accelerate radionuclides, while the coils 5a,5b (among other elements) function to (ii) generate and apply a magnetic field associated with an applied voltage to the radionuclides at a particular ionic cyclotron frequency (or range of frequencies) unique to such nuclide's range, and (iii) generate and apply a magnetic field that creates and exerts Lorenz forces on radionuclide precipitates in order to change (e.g., soften) their morphology. It is expected that a radionuclide precipitate that has a softened morphology may be far easier to remove from wastewater as compared to one that has not been softened.

The inventors discovered that electro-coagulation in turn creates electro-dissolution at an anode, such as anode 4a. That is, the material making up the anode will dissolve. This dissolution leads to the "leaching" of the anode into the wastewater. The inventors have discovered that such leaching results in (a) the formation of hydrolyzed species (e.g., polyvalent metal ions) that efficiently destabilize the radionuclides in the wastewater, helping to form larger, insoluble radionuclide precipitates that are more easily removed, and (b) the eventual degradation of the anode.

In an embodiment, a coagulant used to remove radionuclides, or other targeted pollutants, from the wastewater may be generated in situ by the simultaneous dissolution of the anode material (e.g. aluminum) at the anode and formation of hydroxyl ions and hydrogen gas at the cathode. The inventors discovered that the mechanism of electrocoagulation-flocculation is complex and involves a series of steps that lead to the formation of a floc layer. In an embodiment, the probe 3 may comprise an anode electrode 4a (see FIGS. 2 and 4) that is operable to function to initiate electrocoagulation through its dissolution which forms metal ions at the anode due to electrolysis. The metal ions undergo hydrolysis and generate metal hydroxides. Simultaneously, the anode electrode functions to electrolyze water to form oxygen gas at the anode. Substantially simultaneously, the probe's cathode electrode 4b (see FIG. 4) functions to electrolyze water as hydrogen gas at the cathode. Accordingly, as mentioned previously, the inventors discovered that the anode material (e.g., aluminum) functions to destabilize the unwanted material (radionuclides) in suspension by reducing the repulsive forces between such material. It is believed that the reduction of repulsive forces lowers the energy barrier and enables radionuclide particles to aggregate. Thereafter, the aggregated particles may form a floc of particles.

In more detail, the inventors further discovered that the unique probe 3 structures that they have developed result in the promotion of electro-flocculation due to electrolysis of hydrogen gas at a cathode which leads to the production of hydrogen microbubbles in wastewater surrounding the surface of the cathode. In an embodiment, the at least one cathode electrode (and/or at least one anode electrode) are configured to leach polyvalent metal ions into the liquid and to form hydrogen microbubbles in the liquid surrounding a surface of the cathode electrode to capture the radionuclide precipitates. The generation of hydrogen microbubbles creates mild turbulence within the wastewater, decreasing their specific gravity which, in turn, allows the radionuclide enriched microbubbles to rise (i.e., float) towards the surface of the wastewater that is being treated by the inventive probe 3. The risen, radionuclide enriched microbubbles may form a stable floc layer (i.e., electro-flocculation). Thus, it can be said that the radionuclide precipitates within the wastewater may be captured by rising microbubbles. Those skilled in the art may prefer to remove the risen radionuclides at the surface using appropriate filtration processes before the radionuclide enriched microbubbles burst. Alternatively, the radionuclides may be removed from the bottom of the wastewater after the rising bubbles have collectively spread over the surface of the wastewater, and after the bubbles eventually burst resulting in the sinking of the collected radionuclides to the bottom.

The inventors provide for a number of mechanisms to remove radionuclides, or other targeted pollutants, where the type of mechanism used depends on the type of radionuclide involved. It is believed that radionuclides present in aqueous form (e.g., in a liquid, like water) may form a precipitate when aggregated with a polyvalent metal ion and/or a hydroxyl ion. Otherwise, a precipitate formed due to electrocoagulation may remove the radionuclides, or other targeted pollutants, by way of hydrogen bonding or van der Waals interactions. Yet further, alternatively, a precipitate may physically "sweep" the radionuclides from suspension. For example, the hydrogen gas microbubbles that are generated during electrochemical reactions may carry a layer of floc to the surface of the suspension where it can be later removed.

Figure 2:
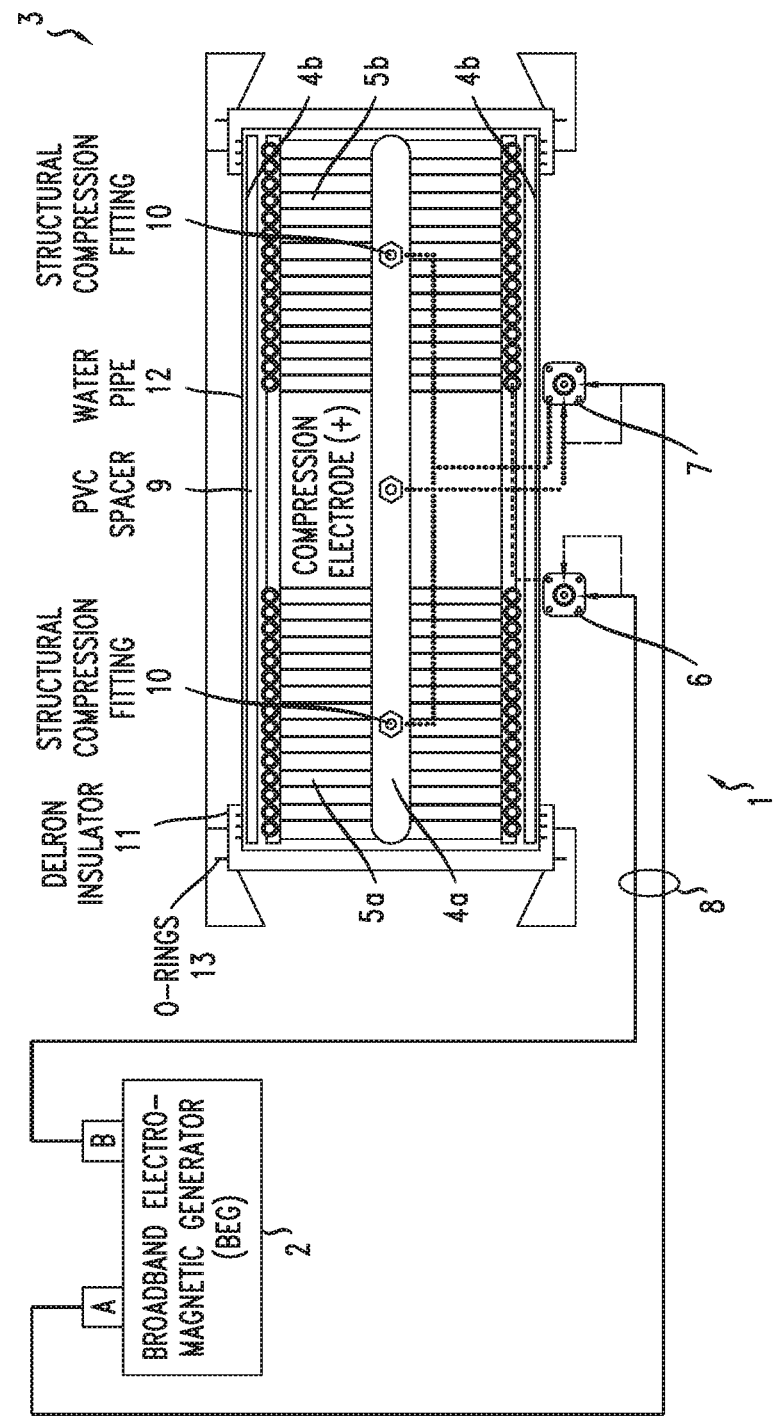
FIG. 2 depicts another view of an exemplary device for treating radionuclides in a liquid according to one embodiment of the invention.
Figure 4:
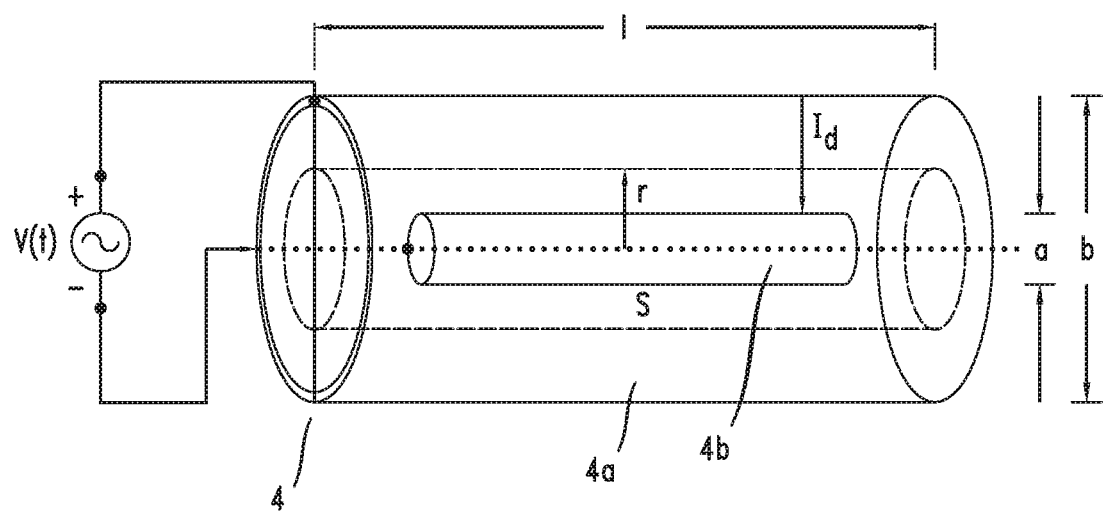
FIG. 4 depicts a simplified representation of an electric field generating element of an exemplary device for treating radionuclides in a liquid according to one embodiment of the invention.

In an embodiment, the probe 3 may comprise a cylindrical pipe 4b configured as a cylindrical negative electrode (cathode) configured to surround a cylindrical rod 4a configured as a positive electrode (anode) (see FIGS. 2 and 4 herein, and FIGS. 2E through 2G of the '501 application, incorporated by reference herein, for views of an example of such a structure). A PVC spacer 9 (e.g., 1-inch spacer) may function as an insulator to insulate the radial magnetic field generated by the magnetic field section (e.g. coils 5a,5b) from the negative electrode (cathode). It also functions to minimize coupling from the negative electrode on the magnetic field that is generated to reduce magnetic field attenuation. The positive electrode (e.g., anode) 4b may be configured along a central axis of the probe 3, for example, and transverse the negative electrode's (cathode) 4a length. In an embodiment, the probe 3 may comprise two 50-ohm input ports 6,7, via cables 8 that function to connect the probe 3 to the generator's 2 power ports, A, B respectively. In an embodiment, the probe 3 is operable to generate and apply time-varying electric fields and induced magnetic fields, and time varying magnetic fields and induced electric fields to radionuclides and their respective particles in a liquid, such as water, for example.

The microcontroller 2a may be operable to send control signals to the generator 2. Upon receiving the control signals the generator 2 may be operable to generate a voltage having an amplitude that corresponds to the control signals and apply the voltage via cables 8 to electrodes 4a,4b of the probe 3 to generate, and control, the probe's applied electric and magnetic fields. Upon receiving such an applied voltage signals, the electrodes 4a,4b may be operable to generate an electric field (or fields) that oscillates between two values—positive and negative between 0 and $\pi$ radians of an alternate current, radio-frequency (AC/RF) cycle. In another embodiment, the electrodes may be operable to generate an electric field that oscillates between $\pi$ and $2\pi$ of an AC/RF cycle where the polarity of the AC signal being applied to each electrode is reversed based on control signals sent from the microcontroller 2a to the generator 2, for example. In an embodiment, both electrodes may interchangeably function as an anode and/or cathode in each cycle. As a result of the reversing of polarities at a given frequency, the inventors believe that there is no significant change in the motion of the suspended colloidal particles of radionuclides in wastewater at, and around, the electrodes. Rather, there are only arbitrary changes due to the effects of Brownian motion.

Further, the inventors discovered that reversing the polarity of each electrode allows the probe to control the pH of the wastewater. In more detail, the inventors' experiments revealed that the pH of wastewater increases due to, it is believed, the effects of electrolysis which creates hydrogen gas at the probe's cathode when the cathode's polarity is negative, and decreases the pH of the wastewater at the probe's anode when the polarity at the anode is positive due to oxygen gas generated at the anode. In an embodiment, to control the pH so that the generation of such gases are reduced, the microcontroller 2a may control the polarity of the electrodes (anode and cathode), by, for example, reversing the polarity of each electrode so that pH value is near neutral when the wastewater is eventually discharged to the environment. The device 1 may include one or more sensors (not shown in FIG. 1) that are operable to measure the pH of the wastewater by providing signals representative of a measured pH to the microcontroller 2a, for example.

Because the electrochemical reactions involved in decontaminating radionuclides are pH dependent, the selectivity of the desired trivalent metal ion is achieved from both electrodes due to the reversing polarity of the electrodes and controlled applied current.

For the benefit of the reader, we present some exemplary illustrative reactions:

For pH<4
At an anode:

$$Al(s) \rightarrow 3e^- + Al^{3+}(aq) \tag{1}$$

At a cathode:

$$2H^+(aq) + 2e^- \rightarrow \uparrow H_2(g) \tag{2}$$

It is believed that the kinetics of the reactions above depend on the release of hydrogen ions [H$^+$] via H$_2$ evolution. As a result, it is believed that the reaction will proceed quickly for strong acids whereas for weak acids, the rate of the reaction depends on the p$K_a$ value.

For pH>4
At an anode:
Reactions (1) and (2) as well as the following reaction. Aluminum anode also undergoes hydrolysis.

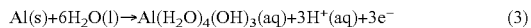
$$Al(s) + 6H_2O(l) \rightarrow Al(H_2O)_4(OH)_3(aq) + 3H^+(aq) + 3e^- \tag{3}$$

Precipitate floc begins to form:

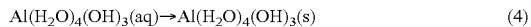
$$Al(H_2O)_4(OH)_3(aq) \rightarrow Al(H_2O)_4(OH)_3(s) \tag{4}$$

The same cathode reaction occurs.

Referring back to FIG. 1, as shown the device 1 may further comprise one or more 50-ohm impedance coaxial transmission lines 8 (e.g., cables) connecting the generator 2 to the probe 3. The electric and magnetic fields generated by the probe 3 result in the application of an Electro-Motive Force (EMF), hereafter referred to as an applied voltage (V). The device 1 may be operable to generate and apply a time-varying electric field having an applied voltage (V), one example of which takes the form of a sine wave. In embodiments, the signals generated by the generator 2 used to generate the time varying applied voltage (V) may comprise a carrier operating frequency of 13.58 MHz, 27.15 MHz, 40.68 MHz, between 912 MHz-925 MHz, between 2.40 GHz-2.5 GHz, between 5.7 GHz-5.8 GHz, and 24 GHz, for example, Signals at these frequencies may be controlled by the exchange of control signals between the microcontroller 2a and generator 2, for example.

Figure 6:
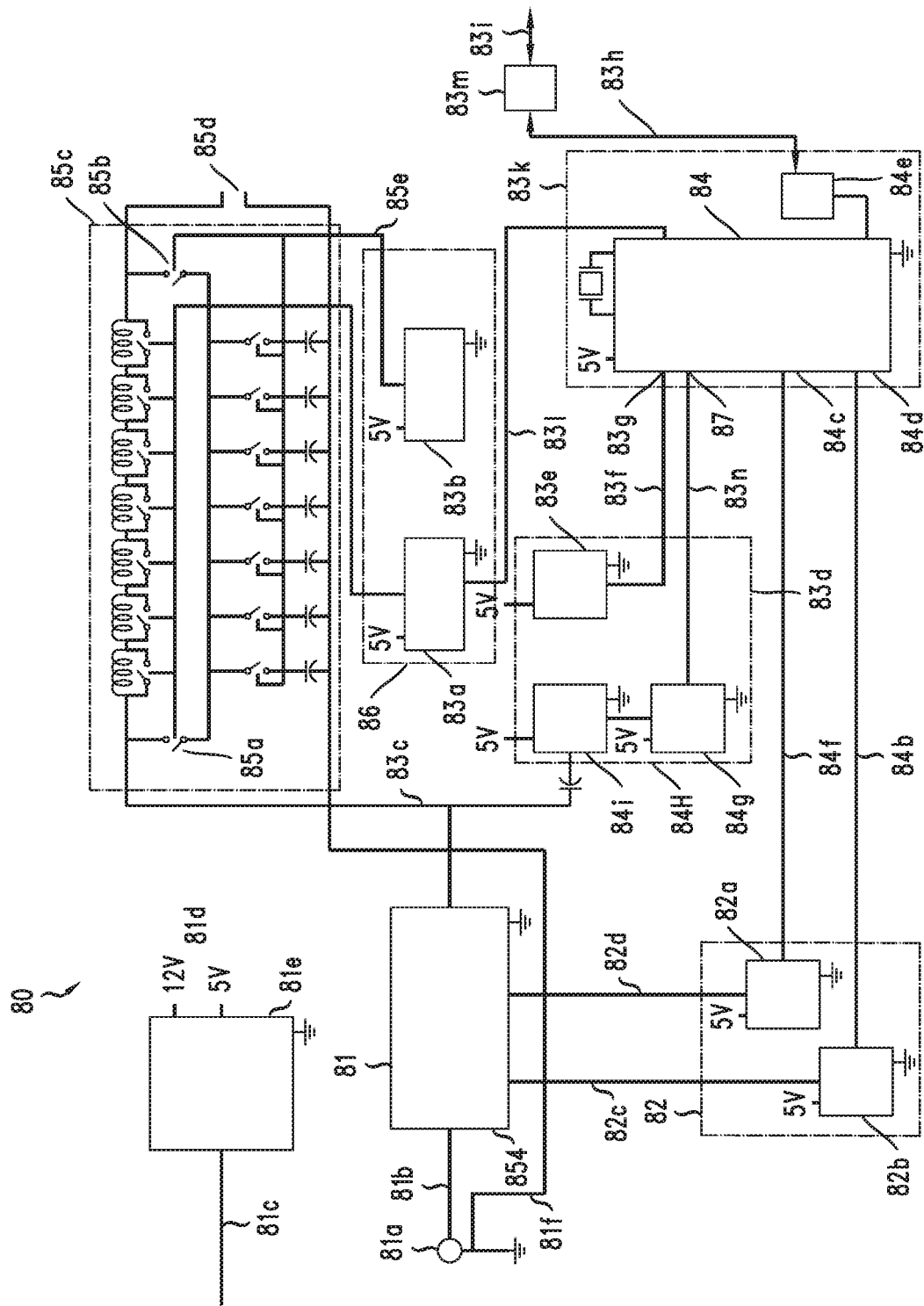
FIG. 6 depicts exemplary impedance matching circuitry according to an embodiment of the invention.

Referring now to FIG. 6, there is depicted impedance matching circuitry 80. In an embodiment, the impedance-matching circuitry 80 may be integral with the probe 3, or may be a separate element connected to at least the probe 3, for example. In an embodiment, the circuitry 80 may be operable to function to maintain a 50-ohm input impedance for the probe 3 over a range of operating frequencies. As explained further herein, this allows the device 1 to maintain the application of a desired applied voltage (e.g., maximum amplitude of an applied voltage) even though the characteristics of the radionuclides in the wastewater changes. In turn, by maintaining a desired voltage, devices provided by the present invention can maintain a desired modulation frequency (e.g., an ionic cyclotron modulation frequency) of a modulated signal generated by the generator 2. The use, and maintenance of, a desired ionic cyclotron modulation frequency is believed to aid in the precipitation of radionuclides, as discussed further herein.

Said another way, as the mineral content, type, and concentrations of wastewater changes, the inventors discovered that this effects the energy (i.e., voltage) being applied to the wastewater. For example, a change in mineral concentration may lead to a change in the conductivity of the wastewater. This change in conductivity typically leads to a change in the voltage applied to the wastewater, and, because the strength of the electric and magnetic fields being applied to the wastewater depends on the voltage being applied, their respective values change as well.

In order to effectively and efficiently treat unwanted material (e.g., radionuclides) in the wastewater, it is believed that the fields being applied to the wastewater, in particular the magnetic field, should remain at a constant level that is related to an ionic cyclotron modulation frequency of a radionuclide in the wastewater. In particular, it is believed that the amplitude of an applied magnetic field should remain at a constant, maximum amplitude.

Accordingly, realizing that it is difficult to predict, and therefore to control, the characteristics of the wastewater (i.e., it changes over time), the inventors discovered devices, such as device 1 in combination with impedance matching circuitry 80, that maintains the amplitude of an applied magnetic field at a constant, maximum amplitude, even though the characteristics of wastewater changes.

In more detail, as the content, concentration, and type of minerals and other unwanted material (i.e., radionuclides that are sought to be removed, reduced or treated) in wastewater changes, the conductivity of the wastewater also changes, which results in a change in the applied voltage and to the impedance of the probe 3. More particularly, as precipitants are introduced into wastewater the inventors discovered that the conductivity of the wastewater changed, which eventually led to a change in the impedance of the probe 3.

As the probe's impedance varies, an impedance mismatch is created between the generator's 2 output impedance and the probe's 3 input impedance. Having discovered this, the inventors provide for the inclusion of impedance-matching circuitry 80 in the device 1, for example, in order to adjust the probe's 3 input impedance to the impedance of one or more of the coaxial transmission lines 8 and the varying output impedance of the generator 2 to maintain an overall impedance of an electrical circuit represented by the generator 2, conductor(s) 8 and probe 3.

In an embodiment, a microcontroller 84, which may be one and the same as microcontroller 2a in FIG. 1, or may be a different, second microcontroller may be operable to execute stored instructions in order to compute the probe's 3 complex impedance (Z) as the sum of a measured resistive component (R), an inductive reactance component (j$\omega$L) and/or a capacitive reactance component (1/j$\omega$C) where:

$$Z = R + j\omega L + 1/j\omega C.$$

In an embodiment, upon computing the impedance of the probe 3, microcontroller 84 may be operable to send signals to the impedance matching circuitry 80 to adjust (e.g., cancel) inductive and/or capacitive reactance components 85c so that the only remaining portion of (Z) is the 50-ohm resistive component. In an embodiment, the impedance of the 50-ohm, conductor (e.g., coaxial transmission line) 8 may match the input impedance of the probe 3 in order to provide maximum radio frequency power (forward power) to the probe 3 and in turn, provide very low reflected power to the generator 2. In an embodiment, the inventors discovered that when forward power from the generator 2 to the probe 3 is high, and the reflected power from the probe 3 to the generator 2 is low, the device is operable to generate an electromagnetic field having a maximum strength, corresponding to a low Voltage Standing Wave Ratio (VSWR). In an embodiment, the generation and application of such a maximum strength electromagnetic field to wastewater optimizes the treatment (removal, reduction, change in morphology) of radionuclide precipitates, for example.

In more detail, the generator 2 may include one or more RF detectors 82*a*, 82*b* that are operable to measure the forward and reflected RF powers mentioned previously. Further, the microcontroller 84 may be operable to receive signals from the RF detectors 82*a*, 82*b* representative of the measured forward and reflected powers and compute a VSWR value. The microcontroller 84 may comprise circuitry, such as a memory for storing instructions for computing VSWR values and/or storing data representative of a VSWR value, for example, and a processor that is operable to access such instructions and/or data in order to compute the VSWR values. Upon determination of the VSWR values, the microcontroller 84 may be further operable to send one or more signals to the impedance-matching circuitry 80 to adjust the appropriate inductive and capacitive elements 85*c* of the circuitry to cancel, adjust or adapt, the inductive and/or capacitive reactance that corresponds to a computed VSWR values based on the measured forward and reflected powers detected at the probe 3 to ensure that the load on the generator 2 remains a 50-ohm resistive load. Alternatively, the microcontroller 84 may be operable to send one or more signals to microcontroller 2*a*, or another microcontroller associated with the probe 3 (not shown in figures) that, in turn, is operable to control the impedance-matching circuitry 80 to adjust the appropriate inductive and capacitive elements 85*c* of the circuitry to cancel, adapt or adjust the inductive and/or capacitive reactance that corresponds to a computed VSWR values that is based on the measured forward and reflected powers detected at the probe 3 to insure that the load on the generator 2 remains a 50-ohm resistive load.

In one embodiment, a VSWR value of 1.5:1 or less is believed to be most effective in the treatment of liquids that contain unwanted material, such as radionuclides. Furthermore, a VSWR value of 1.5:1 or less may prolong the generator's 2 mean time between failures (MTBF) and make it more energy efficient.

In more detail, the microcontroller 84 may be connected to the positive and negative terminals of the electric field section (electrodes) and magnetic field section (coils) of a probe 3 that may have a fixed impedance of 50 Ohms, for example. To achieve and maintain a VSWR value of 1.5:1 or less, the microcontroller 84 may be operable to automatically measure both the forward RF energy/power (F) and reflected RF energy/power (R) of the positive and negative conductive elements, respectively. From such measurements, the microcontroller 84 may be operable to compute a VSWR value based on the following relationship:

$$VSWR=(1+\sqrt{(R/F)})/(1-\sqrt{(R/F)})$$

The microcontroller 84 may be operable to store the computed VSWR values as so-called "look up tables" in onboard memory or in associated memory (not shown in FIG. 6). Upon computing a VSWR value, the microcontroller 84 may be further operable to account for the effects of a given probe's reactance by controlling an impedance tuning section 85*c* that includes inductive and capacitive elements in order to select (e.g., add, subtract) an appropriate capacitance to cancel out an inductive reactance, and/or select an appropriate inductance to cancel out capacitive reactance.

The impedance matching circuitry 80 may also include a directional coupling section 81 that is operable to receive an RF signal from the generator 2 and provide forward and reflected power to the two RF power sensors 82*a*, 82*b*. RF power sensors 82*a*, 82*b* may be operable to provide both forward and reverse power linear voltages to the microcontroller 84 via analog-to-digital converter inputs of the microcontroller 84 in order to allow the microcontroller 84 to compute a VSWR based on the forward and reflected voltages.

Elements of section 85*c* may comprise polyimide, epoxy glass, alumina ceramic, or silicon dioxide printed circuit board dielectrics that are configured as banks of fixed distributed transmission line network capacitors and inductors. Alternatively, the banks include fixed distributed network capacitors $C_1$ to $C_n$ and fixed distributed network inductors $L_1$ to $L_n$ (where "n" denotes the last capacitor or inductor in a bank). Further, the tuning section 85*c* may comprise MOSFET shift registers 83*a*, 83*b* and high frequency microwave switch 85*a*, 85*b* for example. The microcontroller 84 may be operable to configure the tuning section 85*c* by, for example, sending signals that effectively selects a combination of capacitors and inductors and selects either a low impedance or a high impedance high frequency microwave switch 85*a*, 85*b* respectively, to achieve an appropriate VSWR value (e.g., low or lowest VSWR values).

A signal output from the directional coupling section 83*c* may be sent to a power limiting section 83*d* that is operable to reduce the power of the signal, convert the signal to a square wave and feed the converted signal to a divide by 256-frequency counter 83*e*. The signal output from counter 83*f* may be sent to a digital input port 83*g* of the microcontroller 84.

As mentioned before, the impedance matching circuitry 80 includes structure that functions to cancel the inductive and/or capacitive reactance components of the probe 3 so that the only remaining portion of the probe's impedance, (Z), is the 50-ohm resistive component. For example, upon determination of the VSWR values, the microcontroller 84 may be operable to send signals that instruct the tuning section 85*c* to select a combination of capacitors and inductors to achieve an appropriate VSWR value (e.g., low or lowest VSWR values) to cancel the appropriate inductive and/or capacitive reactance of the probe 3 so that only a 50-ohm resistive load is applied to the generator 2.

A "wake-up" signal generating section 84*b* may also be included. Section 83*d* may be operable to place the microcontroller 84 in a "sleep" mode when the microcontroller 84 is not required to compute a VSWR value (e.g., when a previously computed VSWR value stored in a look-up table is used), and to "awaken" the microcontroller 84 from a sleep mode in order to prompt the microcontroller 84 to compute a VSWR value, for example.

In one embodiment of the invention, the microcontroller 84 may be further operable to store specialized instructions (e.g., firmware) in a memory, where the specialized instructions may be used to control and/or configure elements of 85*c*. One such configuration may be used to, for example, minimize the number of tuning adjustments. For example, in one embodiment, the microcontroller 84 may access stored, specialized instructions to complete coarse tuning. In such a case, the microcontroller 84 may be operable to send a signal to deactivate the high impedance high frequency microwave switch 85*a* if necessary, and then control the operation of MOSFET shift registers 83*a*, 83*b* to select an individual inductor $L_1$ to $L_n$ corresponding to a matching impedance. Upon selection of a set of inductors $L_1$ to $L_n$, the microcontroller 84 may then be operable to select capacitors $C_1$ to $C_n$ that also correspond to the matching impedance, and compute VSWR values. If, upon making such computations, an appropriate VSWR value is not computed, the microcontroller 84 may be operable to activate the low impedance high frequency microwave switch 85b, and then repeat the selection of inductors $L_1$ to $L_n$, capacitors $C_1$ to $C_n$ and computations.

In one embodiment, upon completion of coarse tuning, the microcontroller 84 may be further operable to complete "fine" tuning of the previously selected inductor and capacitor combinations by further selecting (or de-selecting) such inductor/capacitor elements, and computing VSWR values to determine whether a desired VSWR value or a VSWR value of 1.5:1 or lower can be obtained.

In a further embodiment of the invention, system 80 (e.g., microcontroller 84) may be operable to continuously compute VSWR values and compare such computed values to a stored reference VSWR value (e.g., 1.5:1). When a comparison indicates a computed VSWR value is greater than the stored reference, the microcontroller 84 may initiate or repeat further coarse and fine-tuning sequences. Otherwise, the microcontroller 84 may not initiate or repeat such tuning. In this manner, the overall impedance of an electrical circuit represented by the generator 2, transmission medium 8 (e.g., cable) and probe 3 can be matched. Further, by controlling the overall impedance, the device 1 (e.g., via microcontroller 84) may also control the amplitude of the electric and magnetic fields applied to wastewater so that such fields can be maintained at a substantially constant level. Because the amplitudes of the electric and magnetic fields are held constant, the applied electric and magnetic fields will be able to apply optimum Lorentz type forces to the radionuclides in the wastewater at a corresponding ionic cyclotron frequency.

Figure 3:
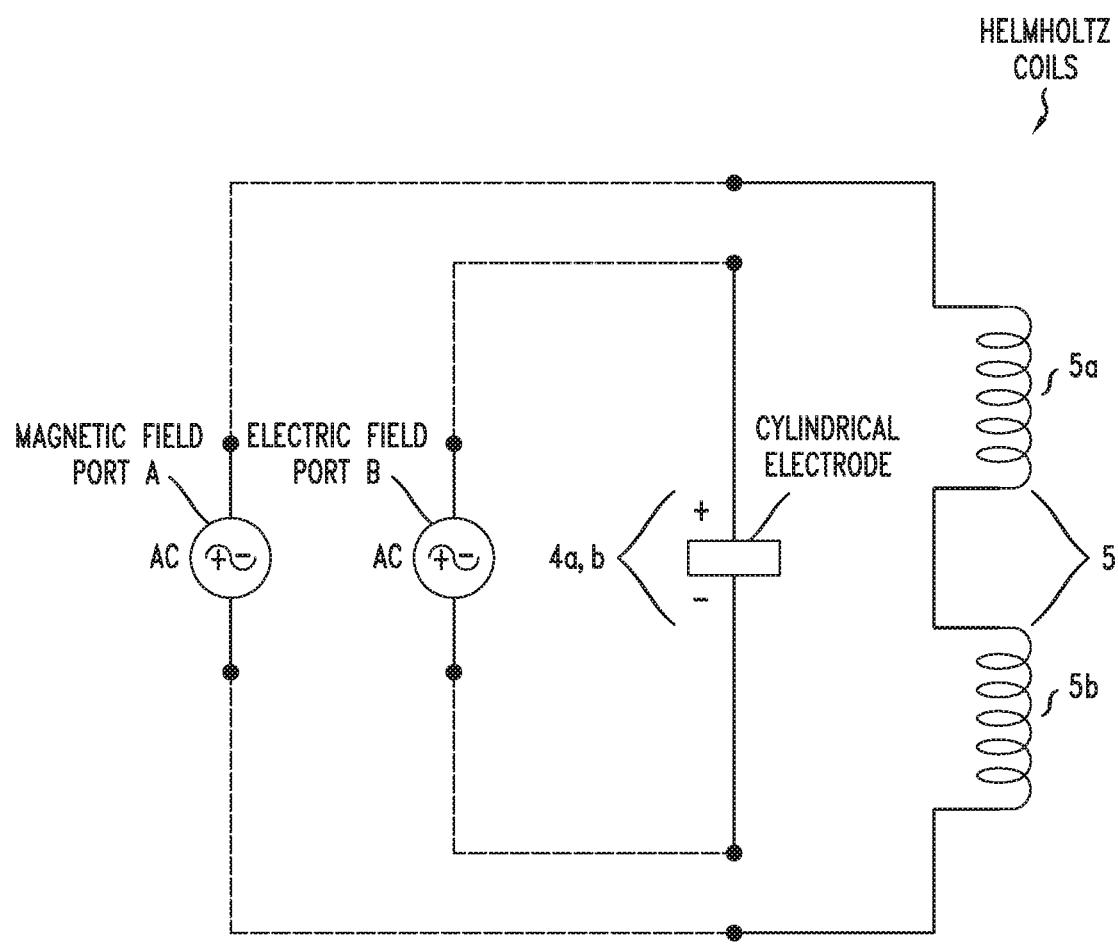
FIG. 3 depicts a simplified electrical circuit representing a device for treating radionuclides in a liquid according to one embodiment of the invention.

As noted previously, in one embodiment a magnetic field generating section may comprise one or more pairs of radial coils 5a,5b configured as Helmholtz coils, where the total magnetic field generated by such a configuration is the sum of the magnetic fields from both radial coils. In the Helmholtz configuration, the coils separation distance (d) equals the radius (r) of the coils, and the distance from the midpoint of the separation distance between the coils is (x). Exemplary views of a Helmholtz coil arrangement can be seen in FIG. 2, as well as FIGS. 2H through 2K of the '501 application, incorporated by reference herein. A simplified, equivalent electrical circuit of an exemplary magnetic field generating section that includes a Helmholtz coil configuration (as well an electric field generating section) is depicted in FIG. 3.

The probe's 3 total generated magnetic field $B_{COIL}=B_{RAD1}+B_{RAD2}$ at a point (x) between the probe's radial Helmholtz coils, can be determined using the equation below:
Where;

$$B_{COIL} = B_{RAD1} + B_{RAD2} = \frac{\mu_o N I r^2}{\left(\left[\frac{d}{2}-x\right]^2 + r^2\right)^{\frac{3}{2}}} + \frac{\mu_o N I r^2}{\left(\left[\frac{d}{2}+x\right]^2 + r^2\right)^{\frac{3}{2}}}$$

Figure 7:
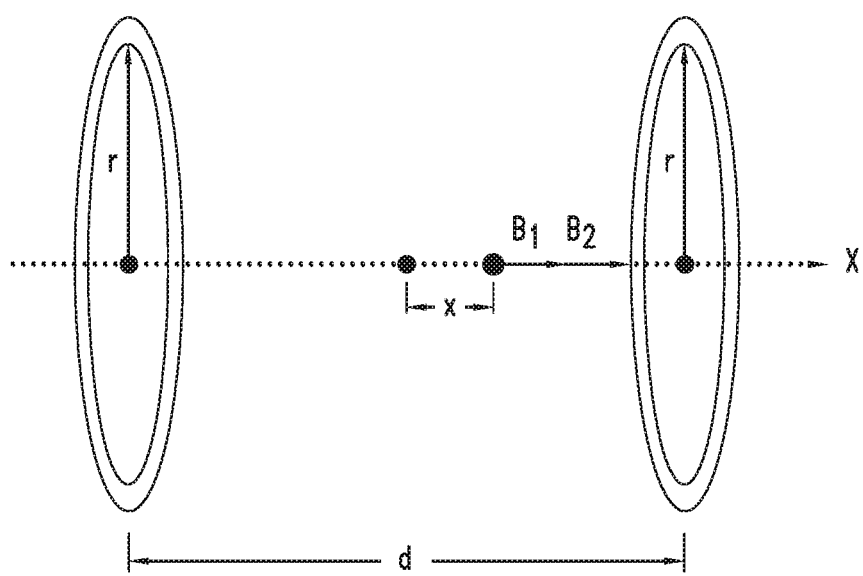
FIG. 7 depicts representative magnetic fields.

The probe's magnetic field ($B_{COIL}$) is uniform where (x)=0 as depicted in FIG. 7 for both radial Helmholtz coil configurations. If the current is (I), the number of coil turns is (N) and (μo) is the permeability of the copper coils, then;

$$B_{IND}=8\mu_o NI/\sqrt{125}r$$

The generated magnetic field ($B_{COIL}$) produces an induced electric field ($E_{IND}$). If (r) represents the radius of the radial Helmholtz coils according to Faraday's law, then the induced electric field ($E_{IND}$) is then:

$$E_{IND} = \frac{1}{2} \cdot B_{COIL} \cdot r$$

FIG. 4 depicts a referential model of an electrical field generating section according to an embodiment of the invention. In this embodiment, upon receiving a voltage generated by the generator 2 applied to its input ports, electrodes 4a,4b may be operable to generate an electric field between the inner (positive) anode 4a and outer (negative) cylindrical 4b cathode. In an embodiment, when the radiuses of the inner and outer electrodes are (a) and (b) respectively, and the length of the outer electrode is (l), the voltage between the electrodes 4a,4b can be represented by:

$$V=Q/2\pi\varepsilon rl\cdot\ln(a/b)$$

and the charge on the electrodes 4a,4b over a period (t) is (Q), while the charge per unit length $\lambda=Q/l$.

Thus, in this embodiment the electrodes 4a,4b may be operable to generate an electric field (E) between the electrodes 4a,4b given by:

$$E=Q/2\pi\varepsilon rl, \text{ wherein } Q=\lambda l, \text{ and } E=\lambda/2\pi\varepsilon r$$

In an embodiment, the electric field (E) generated by the electrodes 4a,4b may be applied to the radionuclides in wastewater and cause the radionuclides to rapidly move back and forth between the negatively-charged cylindrical electrode 4b and the positively-charged cylindrical electrode 4a. It is believed that this rapid back-and-forth movement weakens the morphology of the insoluble radionuclide precipitates.

The probe's generated electric field (E) induces a magnetic field ($B_{IND}$). The induced magnetic field ($B_{IND}$) is governed by Ampere-Maxwell's Law and is responsible for a displacement current ($I_d$) which flows through an imaginary cylindrical surface (S), with length (l) and radius (r), as illustrated in FIG. 4.

The displacement current ($I_d$) flowing from the probe's outer cylindrical electrode 4b to the inner cylindrical electrode 4a crosses surface (S), Where $S=2\cdot\pi\cdot l\cdot r$ Gauss's Law is responsible for the Electric flux density (D)=$\varepsilon_o\cdot\varepsilon_r\cdot E$, hence, the displacement current is:

$$I_d = \frac{\partial D}{\partial t} \cdot S = \frac{\partial}{\partial t} \cdot (D) \cdot (2\pi \cdot r \cdot l)$$

from which the induced magnetic field ($B_{IND}$) can be calculated as a result of ($I_d$), where $B_{IND}=\mu_o I_d/2\pi r$.

The total Magnetic field ($B_{TOT}$) is a summation of the magnetic field of the Helmholtz coils ($B_{COIL}$) and the induced magnetic field ($B_{IND}$). The total Electric field ($E_{TOT}$) is a summation of the induced Electric field ($E_{IND}$) and the electric field (E).

In an embodiment, the probe 3 may generate an electric field that is perpendicular to its generated magnetic field. The total generated electric and magnetic fields produce a Lorentz force on the radionuclides, causing them to emit particles. The Lorentz force is governed by the relationship:

$$F = q[E_{TOT} + (v \times B_{TOT})]$$

where (q), is the charged ions travelling with velocity (v), in the presence of the generated total electric field ($E_{TOT}$) and a generated total magnetic field ($B_{TOT}$). It is believed that the charged particles follow a helical (cycloid) motion when under the influence of an applied magnetic field generated by the probe 3. It is believed that this motion helps keep the particles in a state that is amenable to forming a precipitate that may be removed. The helical motion radius is referred to as the gyro- (or cyclotron) radius. The gyro-radius may be calculated from:

$$r_g = mv/qB_{TOT}$$

where (m) is the mass of the emitted particle, (v) is the velocity perpendicular to the direction of the magnetic field, (q) is the charge of the electric field, and ($B_{TOT}$) is the total magnetic field.

It is further believed that the applied total electric field ($E_{TOT}$) accelerates the particles until a constant drift velocity is reached. The drift velocity can be calculated from:

$$v_d = \mu E_{TOT}$$

where ($v_d$)=drift velocity, (E) is the total electric field, and ($\mu$) is the electrical mobility. Electrical mobility is proportional to the net charge of the particles, and its magnitude is the charge of the emitted particle.

It is believed that this helical motion and associated drift velocity of the particles is also controlled by the application of a magnetic field at one or more ionic cyclotron frequencies. In more detail, the ionic cyclotron frequency ($f_C$) of emitted particles from a radionuclide can may be calculated based on the total magnetic field ($B_{TOT}$) as follows: where $$\omega = 2\pi fc = \frac{z * e * B_{TOT}}{m}, \text{ and } fc = z * e * B_{TOT} / 2\pi * m$$

and ($\omega$) is the radial frequency of the emitted particle, (z) is the number of positive or negative charges of the emitted particle, (e) is an elementary charge, and (m) is the mass of the emitted particle.

From above, it can be seen that the ionic cyclotron frequency, $f_C$, is directly proportional to the magnitude of the total magnetic field ($B_{TOT}$) and inversely proportional to the mass of an emitted particle. As a result, the ionic cyclotron frequency, $f_C$, will change if the applied electromagnetic field (both magnetic and electric fields) is not held constant. As noted above, the applied magnetic field generated and applied by the probe 3 to the radionuclides causes particles emitted from the radionuclides to accelerate and helically spin, which affects the morphology of the radionuclides and ease of removal, for example. Thus, it is believed that as the electromagnetic field being applied to the wastewater changes, so too does the ability to remove radionuclides from the wastewater changes.

An example of a carbon-14 radionuclide $f_C$ calculation (beta decay) is:

$$e = 1.6020e^{-19} \text{ A} \cdot \text{s}$$

$$z = 1$$

-continued $$B_{TOT} = 50e^{-6} \text{ kg/A} \cdot \text{s}^2$$

$$m = 9.10938356e^{-31} \text{ kg}$$

$$fc = \frac{z * e * B_{TOT}}{m * 2\pi} = \frac{1 * 1.6020e^{-19} * 50e^{-6}}{9.1093835e^{-31} * 2\pi} = 1.4 \text{ MHz}$$

An example of a Radium-226 radionuclide $f_C$ calculation (alpha decay) with an increase in the total magnetic field from 50 µT to 1 T to account for larger particle mass is:

$$e = 2 * 1.6020e^{-19} \text{ A} \cdot \text{s}$$

$$z = 2$$

$$B_{TOT} = 1 \text{ kg/A} \cdot \text{s}^2$$

$$m = 6.64424e^{-27} \text{ kg}$$

$$fc = \frac{z * e * B_{TOT}}{m * 2\pi} = \frac{2 * 1.6020e^{-19} * 1}{6.64424e^{-27} * 2\pi} = 7 \text{ MHz}$$

In an embodiment, to ensure that an appropriate ionic cyclotron modulation frequency is used, the device 1 is operable to generate and maintain a constant total magnetic field ($B_{TOT}$) that is associated with a corresponding ionic cyclotron frequency of a radionuclide particle. In more detail, as the conductivity of the wastewater changes due to changes in its radionuclide concentration, for example, this change is detected by the device 1 by detecting (measuring) a change in the measured forward to reflected power (VSWR value) of the generator 2, cable(s) 8 and probe 3 as described previously. Thereafter, as described previously the device 1 may be operable to compensate for the change in VSWR value by adjusting the appropriate inductive and capacitive elements of the impedance matching circuitry in order to generate and apply an electromagnetic field that has a constant amplitude (constant voltage). Thus, when the characteristics of the wastewater being treated changes, the present invention adjusts the impedance to prevent a change in the voltage being applied to generate the applied electromagnetic fields, which in turn prevents a change in the ionic cyclotron modulation frequency. Said another way, the impedance matching circuitry 80 and any associated controller(s) 2a, 84 function to maintain an electromagnetic field having a constant amplitude and an associated ionic cyclotron frequency to target an emitted particle (e.g., of a carbon-14 radionuclide).

In an embodiment, the generator 2 may be operable to generate a signal whose amplitude is substantially constant (and whose form may be a square-wave, sinusoidal, or triangular modulating waveform superimposed on an operating carrier frequency) after receiving control signals from microcontroller 2a (which may be an onboard microcontroller a part of the generator 2), for example. Upon receiving a signal whose amplitude is substantially constant from the generator 2, the probe 3 may be operable to generate a substantially constant electromagnetic field, and apply such a field to particles emitted from the radionuclides. The microcontroller 2a may be operable to send signals to the generator 2 to control the modulation frequency of the applied field from 1 Hz to 5000 Hz, and from 5 kHz to 20 MHz at 100% modulation depth.

Within the knowledge of one skilled in the art, it is known that there are three different types of radioactive decay (alpha, beta, isomeric transition), each of which are associated with the emission of a different emitted particle. The type of decay which a radionuclide undergoes determines the type of particle emitted, which in turn determines the characteristics of the electromagnetic field that should be generated and applied to treat such radionuclides and their associated particles.

Alpha Decay

Within the knowledge of one skilled in the art it is also known that Alpha decay, which results in the emittance of alpha particles, typically occurs in radionuclides that have high atomic mass and mass numbers. Alpha particles typically consist of two protons and two neutrons. Once emitted, the change in ratio of protons to neutrons causes the atomic and mass number to decrease by two and four, respectively.

$$_Z^A M \rightarrow _{Z-2}^{A-4} M + \alpha \qquad (1)$$

There are two stages of alpha decay. The first stage is the separation of a "parent" nuclide into a "daughter" nuclide and an alpha particle. The second stage is the penetration of the alpha particle through a potential energy barrier that is formed by the joint action of nuclear forces and an electrostatic interaction of the alpha particle with the daughter nucleus—essentially the alpha particle is able to escape from the nucleus of the radionuclide.

Beta Decay

Within the knowledge of one skilled in the art, it is further known that beta decay achieves an optimal proton/neutron ratio in the nucleus of a radionuclide. There are two types of beta decay: negative and positive. The type of beta decay is dependent on the parent nuclide. For example, neutron rich nuclides (i.e., those with more neutrons than protons) undergo negative beta decay, while proton rich nuclides (i.e., those with more protons than neutrons) undergo positive beta decay. In beta decay, the mass number of the radionuclide remains the same, but the atomic number changes. The atomic number increases in negative beta decay and decreases in positive beta decay.

$$\text{Negative } \beta \text{ decay: } _Z^A M \rightarrow _{Z+1}^A M + \beta^- + \overline{\nu} \qquad (2)$$

$$\text{Positive } \beta \text{ decay: } _Z^A M \rightarrow _{Z-1}^A M + \beta^+ + \nu \qquad (3)$$

Beta particles are effectively electrons (either positive or negative), with the difference being that they are emitted from a nucleus as opposed to the extranuclear shell.

Isomeric Transition

Those skilled in the art yet further understand that radioactive decay can lead to "daughter" nuclides in a metastable state (excited state). To return to a ground state (stable state), gamma photons are emitted. Gamma radiation is not an independent process (i.e., it always follows another radioactive decay process).

It is known that there exists a Lorentz force which acts upon emitted particles as they travel from the nucleus of a radionuclide. The inventors discovered that the Lorentz force may be adjusted by inventive 1 in combination with impedance matching circuitry 80 (strength of magnetic field) to achieve a desired ionic cyclotron frequency relative to the type of decay (the type of decay depends on the emitted particle as explained above). This excitation of particles promotes collisions with the products of electrocoagulation.

Experimental Set-Up

In one embodiment, the inventors conducted experiments where the device 1 comprises a probe 3 having an anode electrode made from aluminum. As explained previously, in an embodiment the anode may be configured so that polyvalent metal ions that leach from its structure function to destabilize radionuclides by reducing the repulsive forces between radionuclide particles and the polyvalent metal ions. As described previously, it is believed that the reduction in repulsive forces leads to the neutralization of electric charges of such particles, thus lowers the energy barrier and enables the particles to aggregate with the polyvalent metal cations. The aggregation of particles allows for easy removal.

Figure 5B:
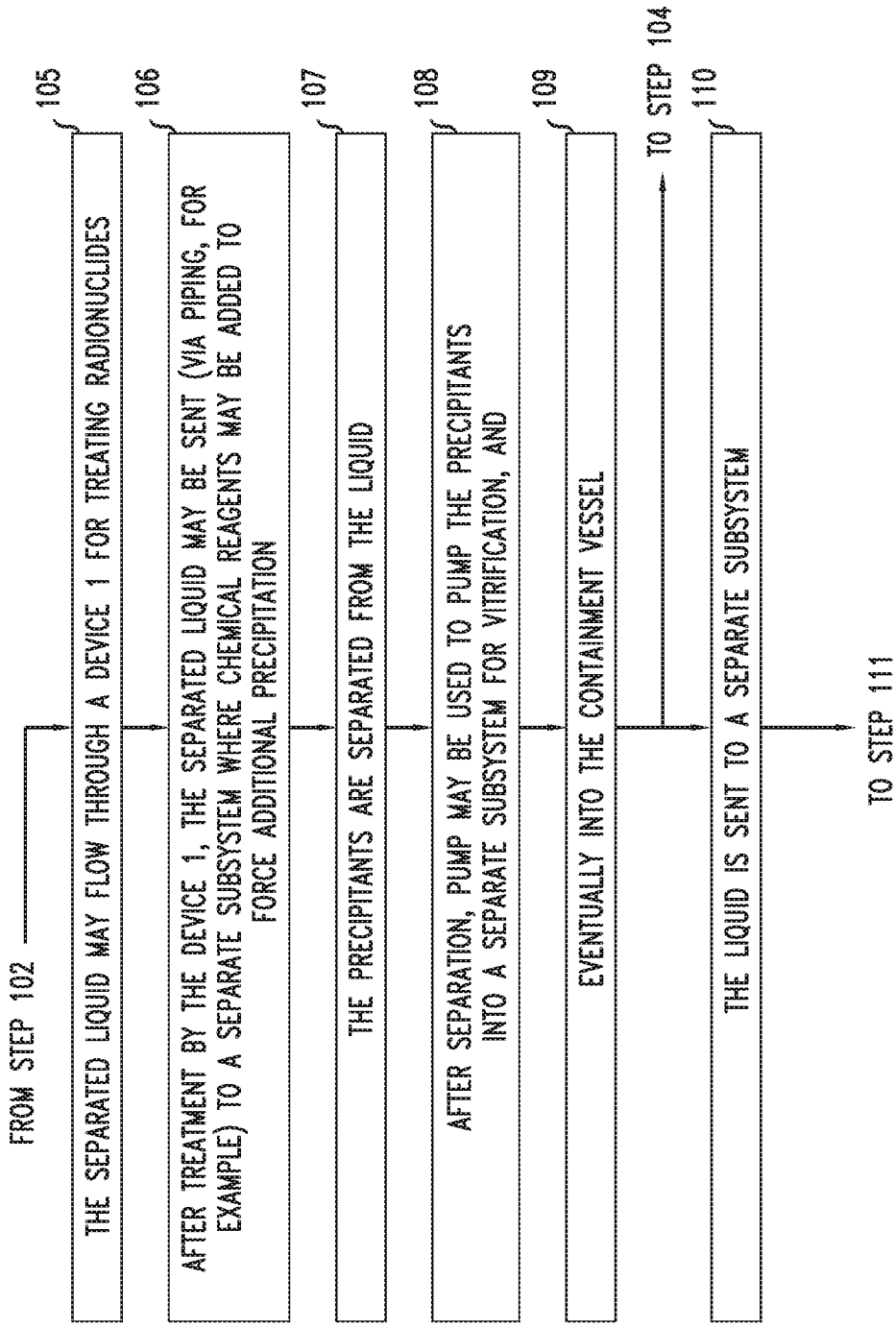

FIGS. 5A to 5C depict an exemplary flow diagram of an experimental method for treating radionuclides. As shown, in step 101, wastewater containing radionuclides may be input into a pretreatment tank where undissolved solids may be filtered using a mechanical solid-liquid separator, for example. In step 102, the separated solids may be removed by pumps to a separate subsystem where it may be dried, heated and then mixed with (for example Amorphous borosilicate) glass-forming chemicals. The separated liquid is sent to yet a second, different subsystem.

In one embodiment, in step 103 the dried mixture may be heated to a temperature of approximately 1000° C. to produce a melt. In step 104, the melt may then be poured into a vessel which functions as a containment subsystem and allowed to cool and form a glass. The vessel may then be sealed and placed in a temporary or long-term storage facility.

In an embodiment, in step 105 the separated liquid may flow through a device 1 for treating radionuclides, such as the device shown in FIGS. 1 and 2. The probe 3 functions as co-precipitator to aid in the precipitation of the radionuclides. Alternatively, in step 106 after treatment by the device 1, the separated liquid may be sent (via piping, for example) to a separate subsystem where chemical reagents may be added to force additional precipitation.

In step 107, the device 1 functions to separate precipitants from the liquid. After separation, in step 108, pumps may be used to pump the precipitants into a separate subsystem for vitrification, and eventually into the containment vessel in step 109, while the liquid in sent to a separate subsystem in step 110.

Once separated and sent to its separate subsystem, in step 111 the liquid may be passed through ion exchange membranes to remove any leftover radioactive impurities and through reverse osmosis membranes to remove microscopic particulate and low concentrations of dissolved materials before being discharged as purified water.

The present invention also provides the ability to monitor, service or otherwise maintain a treatment device (hereafter collectively referred to as "monitor"). In one embodiment, the microcontroller 2a (and or 84) may be operable to communicate with a testing apparatus (not shown in figures) via a telecommunication connection or channel (collectively "channel") to allow information about the operation of the device 1 described herein to be communicated to service or maintenance personnel. In response, the testing apparatus may be operable to exchange specialized instructions with the microcontroller 2a in order to control the operation of device 1 (i.e., its elements, for example) and/or otherwise obtain the status of device 1. The microcontroller 2a may do so via a communications port of the microcontroller to name just one of many ways in which device 1 and its elements may communicate with the testing apparatus.

Further, the testing apparatus may comprise a portable or handheld test set, the communications port may comprise a serial port operable to allow for connection of the handheld or otherwise portable test to microcontroller 2a via a communications channel by service or maintenance personnel. Alternatively, when testing apparatus is located at a remote monitoring station to remotely monitor the treatment of a liquid, the communications port of the microcontroller 2a may comprise modem or other necessary electronics necessary to transmit and receive information to/from such a remote monitoring station via the communications channel. Such a remote station may include an interface (e.g., graphical user interface, "GUI") to permit information exchanged between the device 1 and the remote station to be viewed or otherwise accessed by service or maintenance personnel. For example, in one embodiment the GUI and related electronics may be operable to receive information from the device 1 (e.g., from a microcontroller) related to the formation of flocculated, radionuclide precipitates in a liquid through the application of an applied a voltage to electrodes and through the leaching of polyvalent metal ions into the liquid. Thereafter, the GUI and related electronics may be further operable to control the rate of leaching of the metal ions and formation of the radionuclide precipitates, from the remote station, by exchanging instructions with the device 1 (e.g., with a microcontroller).

It should be apparent that the foregoing describes only selected embodiments of the invention. Numerous changes and modifications may be made to the embodiments disclosed herein without departing from the general spirit and scope of the invention. For example, though wastewater and radioactive wastewater have been the liquids utilized in the description herein, other suitable liquids may be used such as those used in the petrochemical industry. That is, the inventive devices and methods described herein may be used to partially or substantially treat these other liquids as well.

We claim:

1. A device for treating radionuclides in a liquid, comprising:
    a microcontroller that generates control signals that control a rate of leaching of metal ions from electrodes and control formation of radionuclide precipitates in the liquid, the microcontroller sending the control signals to a generator;
    a generator that receives the control signals, generates voltages based on the received control signals where each voltage has an amplitude that corresponds to one of the control signals, and applies the voltages to the electrodes; and
    the electrodes comprising at least one anode and at least one cathode comprising iron nanoparticles that generate an electric field that oscillates between positive and negative values upon receiving the applied voltages and that are configured to leach the metal ions into the liquid, and apply the electric field to radionuclides in the liquid to accelerate the radionuclides to form the flocculated, radionuclide precipitates in the liquid.

2. The device as in claim 1, wherein the microcontroller further generates the control signals that control the pH of the liquid in a range of 4-7.

3. The device as in claim 1 further comprising a pair of magnetic coils operable to generate and apply a magnetic field associated with the applied voltages to the radionuclides over a range of frequencies unique to the radionuclides and to exert Lorenz forces on the radionuclide precipitates to change the morphology of the radionuclide precipitates.

4. The device as in claim 3, wherein the microcontroller further adjusts an overall impedance of a representative electrical circuit comprising the electrodes, the generator and a conductor to control each amplitude that corresponds to one of the control signals and to apply optimum Lorentz type forces to radionuclides in the liquid.

5. The device as in claim 3, wherein the pair of coils are configured as Helmholtz coils.

6. The device as in claim 1 wherein the at least one anode electrode and one cathode electrode are configured to form hydrogen microbubbles in the liquid surrounding a surface of the cathode electrode to capture the radionuclide precipitates.

7. The device as in claim 1, wherein the microcontroller controls the polarity of the at least one anode and cathode electrodes to reverse the polarity of each electrode to control the pH value of the liquid at a substantially neutral value.

8. The device as in claim 1 wherein the liquid is wastewater.

9. The device as in claim 1 wherein the liquid is radioactive wastewater.

10. A device for treating radionuclides in a liquid, comprising:
    a microcontroller that generates control signals that control a rate of leaching of metal ions from electrodes and control formation of radionuclide precipitates in the liquid, the microcontroller sending the control signals to a generator;
    a generator that receives the control signals, generates voltages based on the received control signals where each voltage has an amplitude that corresponds to one of the control signals, and applies the voltages to the electrodes; and
    the electrodes comprising at least one anode and at least one cathode comprising aluminum nanoparticles that generate an electric field that oscillates between positive and negative values upon receiving the applied voltages and that are configured to leach the metal ions into the liquid, and apply the electric field to radionuclides in the liquid to accelerate the radionuclides to form the flocculated, radionuclide precipitates in the liquid.

11. The device as in claim 10, wherein the microcontroller further generates the control signals that control the pH of the liquid in a range of 4-7.

12. The device as in claim 10 further comprising a pair of magnetic coils operable to generate and apply a magnetic field associated with the applied voltages to the radionuclides over a range of frequencies unique to the radionuclides and to exert Lorenz forces on the radionuclide precipitates to change the morphology of the radionuclide precipitates.

13. The device as in claim 12, wherein the microcontroller further adjusts an overall impedance of a representative electrical circuit comprising the electrodes, the generator and a conductor to control each amplitude that corresponds to one of the control signals and to apply optimum Lorentz type forces to radionuclides in the liquid.

14. The device as in claim 12, wherein the pair of coils are configured as Helmholtz coils.

15. The device as in claim 10 wherein the at least one anode electrode and one cathode electrode are configured to form hydrogen microbubbles in the liquid surrounding a surface of the cathode electrode to capture the radionuclide precipitates.

16. The device as in claim 10, wherein the microcontroller controls the polarity of the at least one anode and cathode electrodes to reverse the polarity of each electrode to control the pH value of the liquid at a substantially neutral value.

17. The device as in claim 10 wherein the liquid is wastewater.

18. The device as in claim 10 wherein the liquid is radioactive wastewater.

* * * * *